Dec. 28, 1937.  C. W. BEAMER  2,103,705
DRILL STEEL SHARPENER
Filed May 19, 1936  3 Sheets-Sheet 1
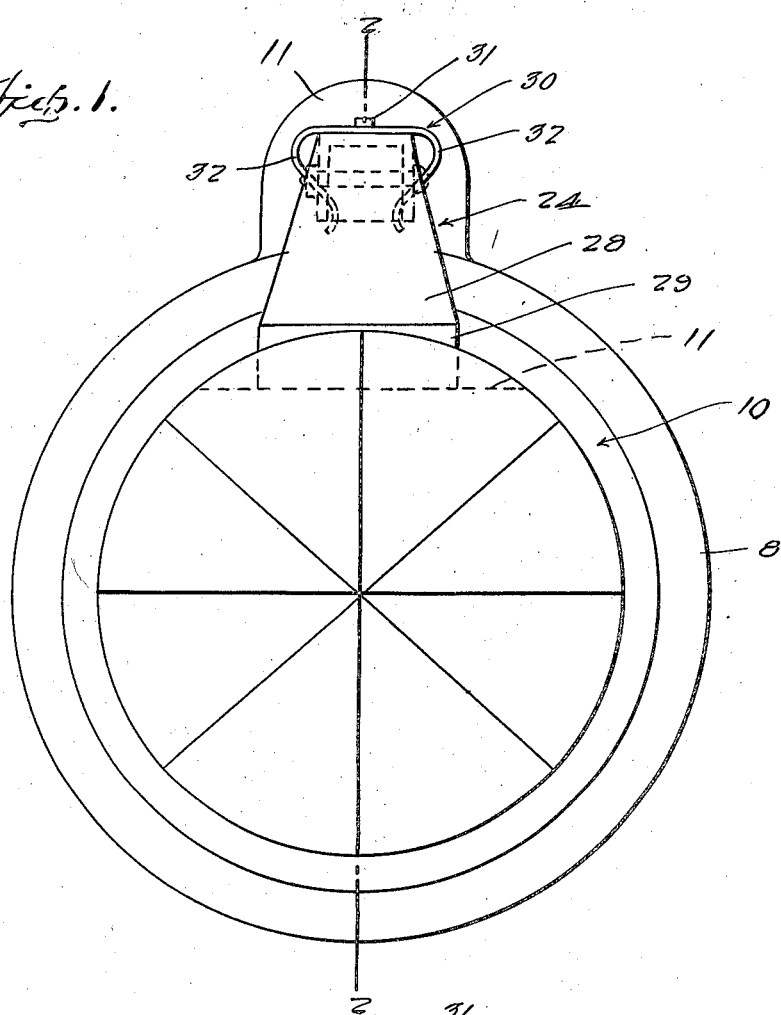
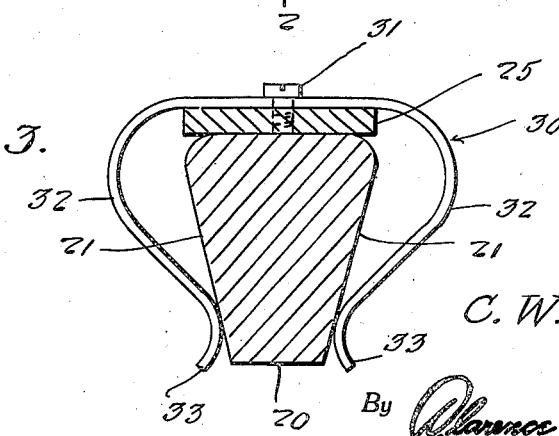
Inventor
C. W. Beamer
By Clarence A. O'Brien
Hyman Berman
Attorneys

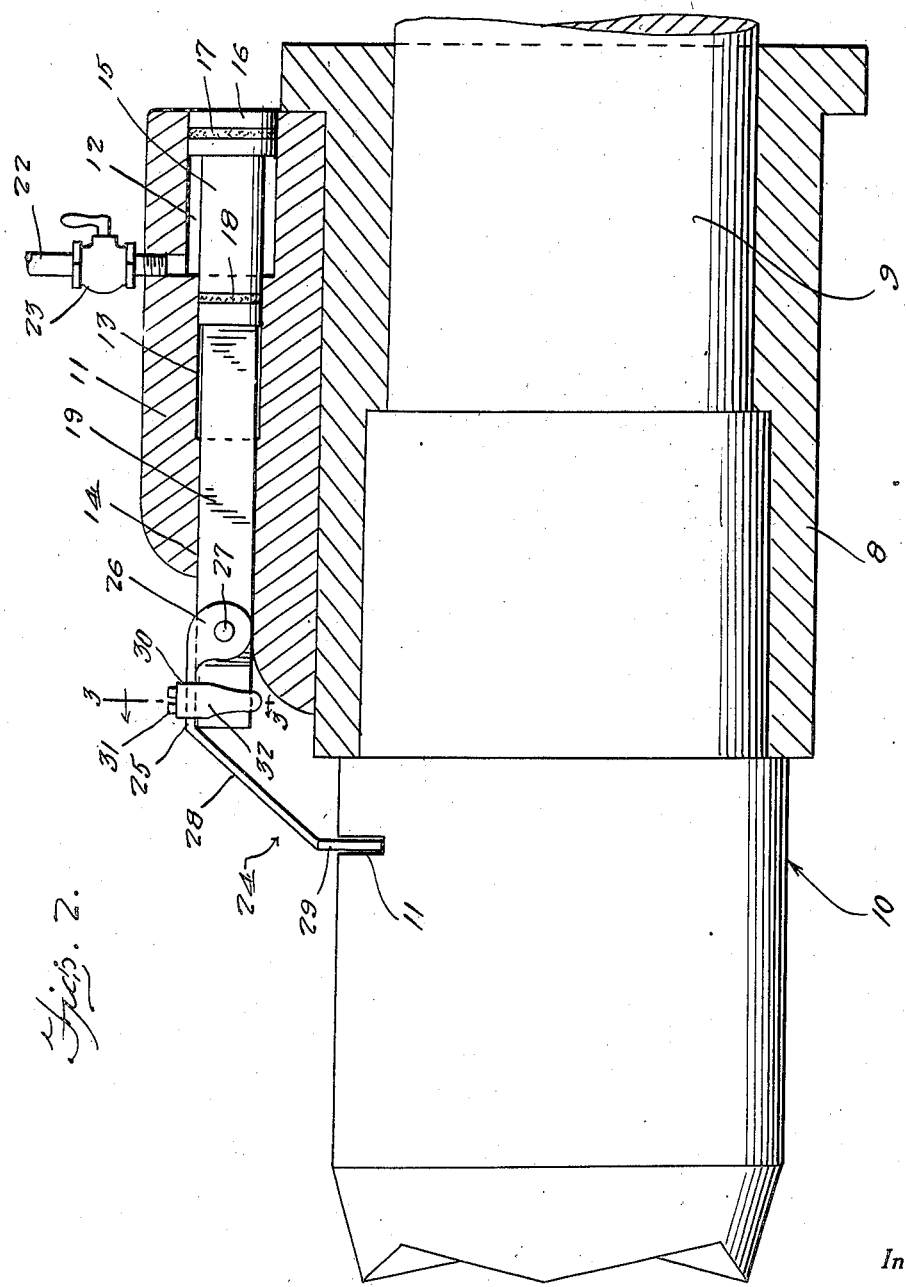

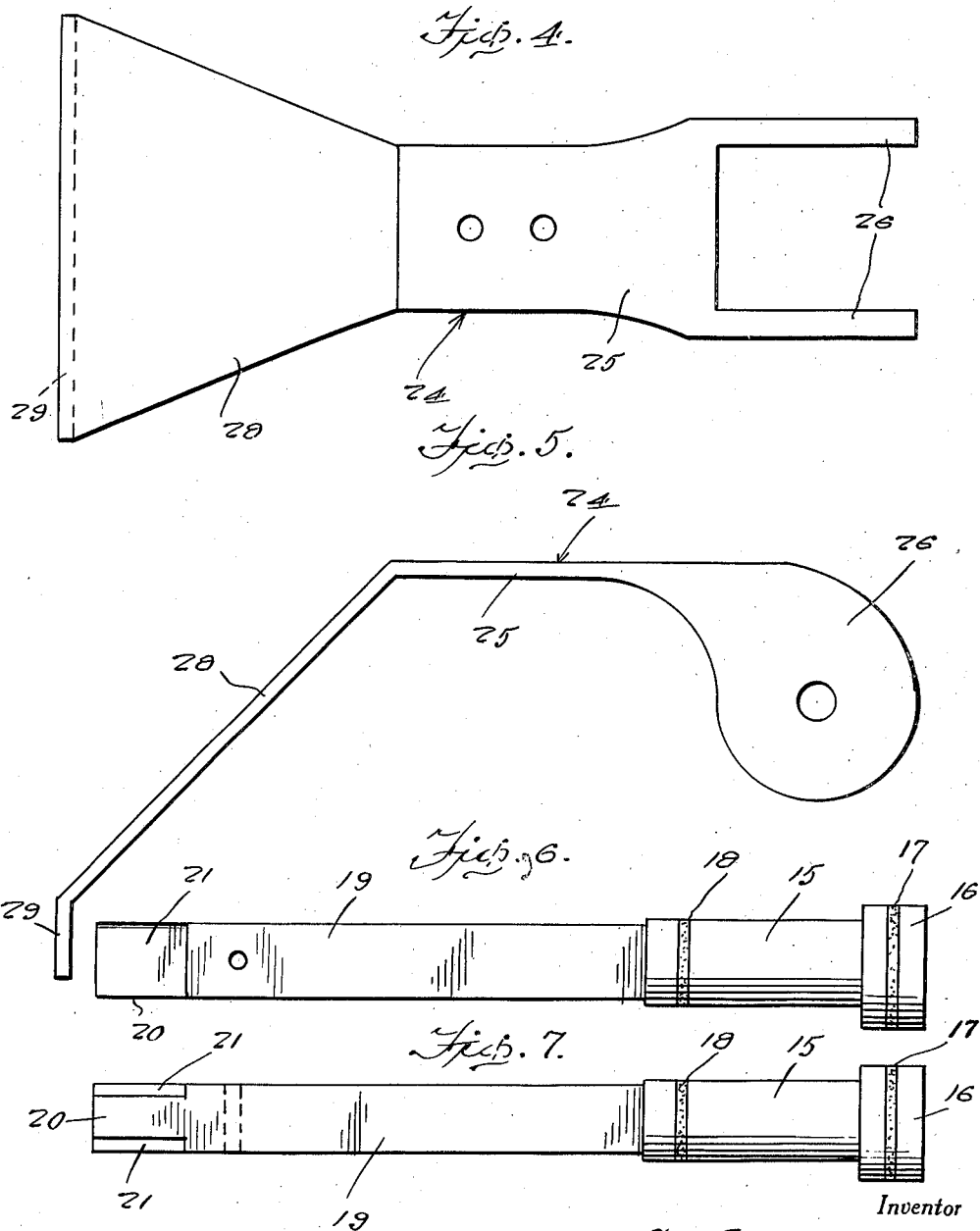

Patented Dec. 28, 1937

2,103,705

UNITED STATES PATENT OFFICE 2,103,705

DRILL STEEL SHARPENER

Charles W. Beamer, Mojave, Calif.

Application May 19, 1936, Serial No. 80,604

11 Claims. (Cl. 121—32)

This invention relates broadly to machines known in the trade as drill steel sharpeners, but has reference in particular to an attachment or accessory for retaining and returning the dolly.

It is believed that the nature of the invention and the general state of the prior art to which it relates may be better understood by calling attention, for example, to the prior patent to one J. Ditson, No. 1,728,601, of September 17, 1929. This prior patent is exemplary of the general nature of the present invention which has reference in particular to the dolly retention and return spring disclosed in said patent. Without attempting to point out explicitly the various disadvantages of the spring arrangement, it may be said that it is subject to frequent breakage and distortion, leading to no end of trouble involving the usurpation of unnecessary time and expense required in making repairs and readjustments.

To those skilled in the art to which the invention relates, it is evident that the reciprocatory dolly is actuated in one direction by a pneumatic hammer. The renewable retention spring, however, returns the dolly to its normal or retracted position. Thus, air pressure is used to move the dolly in one direction, and mechanical spring pressure resorted to to return the dolly to its initial or starting position.

By way of contrast, the present invention has reference to a combined mechanical and pneumatic contrivance susceptible of being built on a conventional type of machine, and used in conjunction with the regulation notched dolly, whereby to accomplish the desired results in a more satisfactory and reliable manner.

Briefly stated, the improved structure is characterized by a reciprocatory piston mounted in a pneumatic cylinder, wherein the stem of the piston is provided on its outer end with a yieldable compensating latch or trigger which constitutes the retaining element for cooperation with the notched dolly.

One feature of the improvement is the incorporation therein of a pivoted latch held in normal position by a resilient clip and cam retention means, whereby to embody sufficient resiliency in the latch to enable it to automatically adjust itself to the slight turning or twist of the dolly, that is, the axial movement thereof which is sometimes necessary for proper matching with the tool or drill to be sharpened.

The other and outstanding feature is the piston and cylinder arrangement wherein air cushioning means constitutes a substitute for the spring to automatically return the dolly to its retracted or starting position.

Other features and advantages will become more readily apparent from the following description and drawings.

In the accompanying drawings, wherein like numerals are employed to designate like details or parts throughout the views:

Figure 1 is an end elevation of a structure showing the working end of the dolly and illustrating the combined mechanical-pneumatic retaining and return device for said dolly;

Figure 2 is a central vertical or longitudinal sectional view, partly in elevation, the section being taken approximately on the plane of the line 2—2 of Figure 1;

Figure 3 is an enlarged transverse or cross-section taken on the line 3—3 of Figure 2;

Figures 4 and 5 are top and edge elevational views of the latch per se; and

Figures 6 and 7 are detail views of the air controlled reciprocatory piston and carrier for said latch.

Referring now to the drawings, and especially to Figure 2, it will be observed that the customary relatively fixed bushing on the frame (not shown) is denoted by the numeral 8, this being designed to accommodate the reciprocatory pneumatically controlled hammer 9 and the dolly 10. The dolly, as is customary, is provided with a cerf or notch 11. In the aforesaid patented arrangement the notch is on the bottom. In the present arrangement the notch is placed on top so as to enable it to properly register with the novel retaining means now to be described.

The invention may be in the nature of an attachment, but is preferably built on as an integral part of the bushing or frame structure. It comprises a part 11 which may be conveniently referred to as a cylinder. This part 11 is in the form of a casting and includes a longitudinal bore extending through opposite ends. The rear end portion of the bore is enlarged to provide the cylinder proper as indicated at 12. Then there is a stepped or reduced cylinder-end as at 13, the front portion of the bore 14 being rectangular in cross-sectional shape. The piston, which is longer than the bore, includes a cylindrical body portion 15 and a head 16 provided with a packing ring 17. There is an additional packing ring 18 on the frontal portion of the piston which is reciprocable in the reduced cylinder 13. Beyond this the stem 19 is polygonal or square in cross-sectional form and extends through and beyond the guide passage 14. It terminates in an extension 20 whose opposite sides are downwardly beveled in converging relationship as at 21 to form cam elements. Air is delivered under pressure into the cylinder 12 by way of the air supply pipe 22 which has a bleed valve 23 therein.

The latch or retainer is in the nature of a trigger unit and is denoted unitarily by the numeral 24. It embodies a relatively narrow shank portion 25 horizontally disposed and resting on the stem 19. This is provided with ears 26 which straddle and are pinned or otherwise fastened as at 27 to the stem. This provides the desired pivotal joint. That portion extending beyond the piston stem 19 is in the form of a gradually widened inclined blade 28 terminating in a finger or detent 29 constructed to fit into the keeper notch or cerf 11.

The numeral 30 designates a spring clip riveted or otherwise fastened at its bight portion as indicated at 31 to the shank. The jaw portions 32 of the clip are of the bowed curvature shown in Figure 3 and the terminal ends 33 constitute cam elements for frictional yieldable engagement with the cam surfaces 21. Thus, the upward lift or swinging or pivotal movement of the latch 24 is regulated by this cam coaction between the resilient fingers 33 and the cam surfaces 31 on the piston stem 19. It would be undesirable to have the latch rigidly connected with the stem, though in actual practice there is a slight axial turning of the dolly 10. This turning action is compensated for or automatically permitted by the spring clip cooperating with the cam surfaces 21. The pivotal operation is desirable in that the entire latch can be lifted clear of the notch 11 to exchange dollies.

It is evident that the dolly 10, through the instrumentality of this invention, is literally hooked to the bushing 8, the hooked connection being normally maintained while the machine is in operation. The construction of the hooked connection is such, however, as to expedite disconnection thereof from the dolly to allow it to be removed or replaced. The latch which accomplishes this separable retention connection is readily available at the top and accessibility is therefore emphasized.

The chief feature of the invention is to do away with the breakable spring referred to in the aforementioned patent and to substitute therefor the pneumatically controlled piston which constitutes a carrier for the latch, which piston provides the desired spring return action.

In practice cylinder 12 is charged with air under pressure from a suitable source (not shown). The machine, thus charged and with the parts shown as indicated in Figure 2, is in readiness for operation. As customary, the hammer 9 drives the dolly 10 in one direction. When the end of the stroke is reached and the air pressure on the hammer 9 intimately relieved, the automatic retainer and return means then comes into play. Obviously, as the piston travels forwardly with the latch and the dolly, this compresses the air in the chamber 12. Upon release of the air pressure on the hammer 9, the air pressure in the chamber 12 overcomes this and thus alternately returns the dolly automatically to its retracted position.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structural assemblage of the class described, in combination, a fixed bushing, a removable pneumatically operated dolly mounted in said bushing and provided with a keeper notch, and reciprocatory pneumatically returned bodily slidable latch means engageable with said notch in the manner and for the purposes described.

2. In a structure of the class described, a relatively stationary frame including a bushing, a pneumatically projected dolly removably mounted in said bushing, said dolly being provided with a keeper notch, a slidably mounted automatically returned carrier device on said bushing and a pivoted yieldable compensating latch on said carrier having a detent releasably engageable with said notch.

3. In a device of the class described, a mounting, a slidable carrier unit in said mounting, automatic springless pneumatic tension and return means for said carrier unit, and a retaining latch pivotally connected to the carrier unit.

4. In a device of the class described, a mounting, a slidable carrier unit in said mounting, automatic tension and return means for said carrier unit, a retaining latch pivotally connected to the carrier unit, together with cam coacting means between the latch and carrier unit permitting relative movement thereof to compensate for axial twisting of an associated dolly.

5. A retaining and return device for a dolly of the class described comprising a mounting, a slide in said mounting, automatic return means for said slide, said slide being provided at one end with latch carrier means, a latch pivotally mounted on said carrier means and provided with a detent cooperable with a dolly.

6. In a structural assemblage of the class described, a cylinder, means to charge said cylinder with compressed air, a piston slidable in said cylinder, and a dolly holding latch pivoted on and carried by said piston.

7. A dolly return and retainer device comprising a mounting having a bore including a cylinder, a piston mounted for reciprocation in said cylinder, means for charging the cylinder with air, said piston having a stem portion slidable through the bore, and a pivoted resiliently retained latch on said stem portion.

8. In a structure of the class described, an automatic pneumatically controlled operating unit including a carrier stem having an extension at one end provided with opposed converging cam surfaces, a dolly engaging latch having a shank portion pivotally connected to said stem, and a resilient clip mounted on said shank portion and including cam fingers engageable with said cam surfaces.

9. As a component part of a structural assemblage of the class described, a retaining latch for a conventional dolly comprising a shank portion having means for attachment to a carrier, a resilient clip carried by said shank portion, said latch including a laterally bent end portion disposed at obtuse angles to the shank, and terminating in a detent disposed at right angles to said shank.

10. In a structural assemblage of the class described, in combination, a fixed bushing, a removable pneumatically operated dolly mounted in said bushing and provided with a keeper notch, a pneumatically controlled retaining device embodying an auxiliary cylinder mounted on said bushing and having its axis parallel to the longitudinal axis of said bushing, means to supply air under pressure into said auxiliary cylinder, a piston mounted for reciprocation in the cylinder, said mounting including a bore in alinement with said cylinder and parallel to the axis of said bushing, said piston being provided with an extension stem slidable through and beyond said bore, and a latch pivotally mounted on the outer end of said stem and having a portion releasably engageable with said notch.

11. In a structural assemblage of the class described, in combination, a relatively fixed bushing, an externally arranged mounting on said bushing having a bore including a cylinder, a pneumatic hammer mounted for reciprocation in said bushing, a dolly slidably and removably mounted in the bushing for cooperation with said hammer, a piston mounted for reciprocation in said cylinder, said piston including an elongated stem, said mounting having a guide bore through which said stem is slidable, said stem and piston being disposed in a horizontal plane and parallel to the longitudinal axis of said pneumatic hammer and dolly, said dolly being provided with a keeper notch, a latch pivotally attached to said stem, and automatically operable compensating resilient means carried by said latch and engageable with said stem permitting limited axial movement of the dolly.

CHARLES W. BEAMER.